(12) United States Patent
Matsui (10) Patent No.: US 6,317,259 B1
(45) Date of Patent: Nov. 13, 2001

(54) INTERFERENCE MICROSCOPE

(75) Inventor: Kumiko Matsui, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/610,960

(22) Filed: Jul. 6, 2000

(30) Foreign Application Priority Data

Jul. 7, 1999 (JP) .................................................. 11-192803

(51) Int. Cl.$^7$ .................................................. G02B 21/00
(52) U.S. Cl. ........................ 359/371; 359/368; 359/386
(58) Field of Search .................................... 359/368, 370, 359/371, 385, 386, 389

(56) References Cited

U.S. PATENT DOCUMENTS

| | | | |
|---|---|---|---|
| 4,744,660 | * | 5/1988 | Noguchi et al. ...................... 356/355 |
| 5,420,717 | * | 5/1995 | Tabata .................................. 359/371 |
| 6,249,349 | * | 6/2001 | Lauer .................................... 356/450 |

* cited by examiner

*Primary Examiner*—Cassandra Spyrou
*Assistant Examiner*—Mark A. Robinson
(74) *Attorney, Agent, or Firm*—Miles & Stockbridge P.C.

(57) ABSTRACT

An interference microscope includes an illumination optical system for making two light beams fall on a subject, an observation optical system for forming an interference image by causing interference between the two light beams from the subject, a detection unit for detecting the interference image, and a calculation unit for calculating a phase difference between the two light beams from a result of the detection by the detection unit. The two light beams contain light having a plurality of wavelengths. The detection unit detects light intensities with respect to the light having the plurality of wavelengths that is contained in the interference image. The calculation unit obtains such a wavelength as to minimize the light intensity from the light intensities of the light having the plurality of wavelengths which are detected by the detection unit, and sets, as the phase difference, a magnitude of the obtained wavelength.

7 Claims, 6 Drawing Sheets

INTERFERENCE MICROSCOPE

The present application claims the benefit of Japanese Patent Application No.11-192803 which is hereby incorporated by reference.

BACKGROUND OF THE INVENTION

1. Field of the Invention

The present invention relates to an interference microscope.

2. Related Background Art

Figure 6:
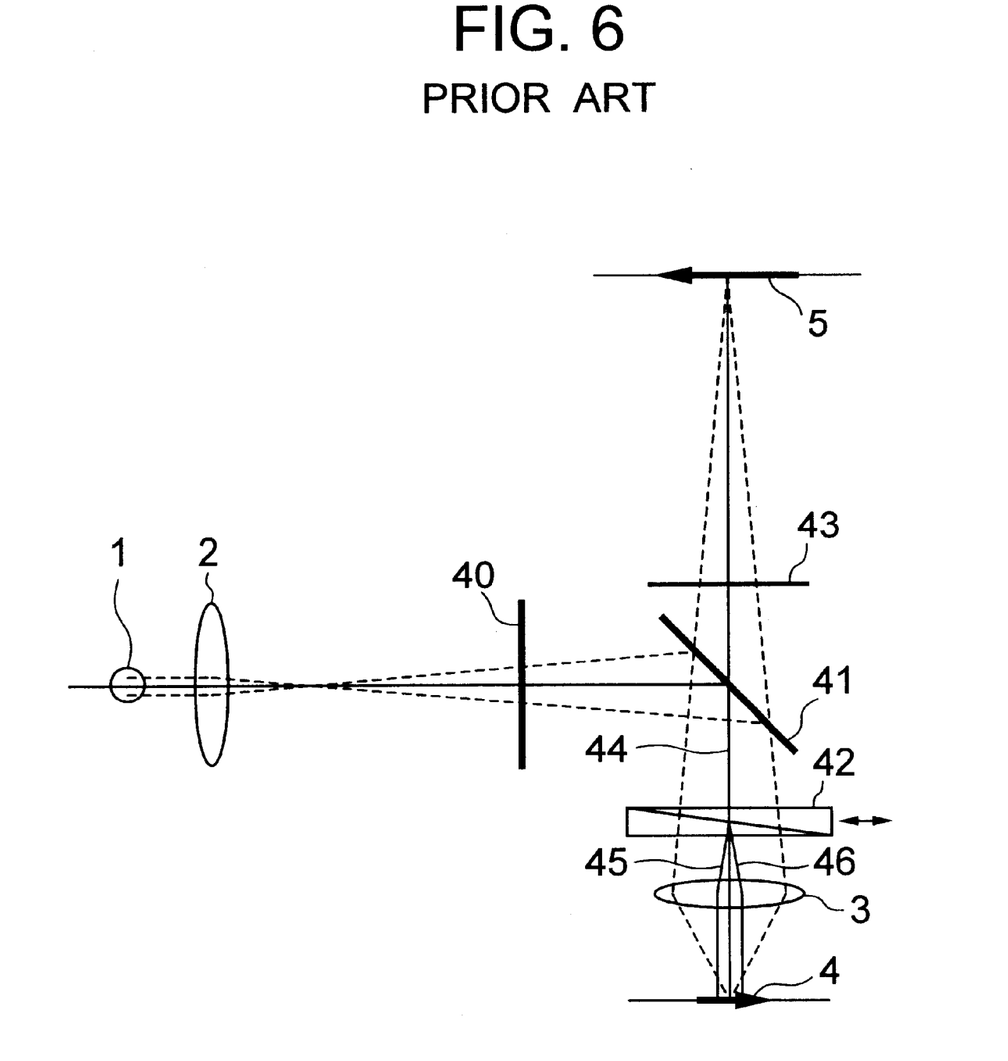
FIG. 6 is a block diagram showing a geometry of components of a conventional reflected light differential interference microscope.

A reflected light differential interference microscope will be explained by way of one example of a prior art interference microscope with reference to FIG. 6. In the differential interference microscope in FIG. 6, a beam of illumination light emitted from a light source 1 is converged by a collector lens 2 and thereafter becomes a beam of linearly polarized light in a polarizer 40. Then, the beam of linearly polarized light is reflected by a beam splitter 41 and thereafter travels through a Wollaston prism 42. The beam of linearly polarized light is, when penetrating the Wollaston prism 42, separated into ordinary ray 45 and extraordinary ray 46 by action of birefringence. Both of those ordinary ray 45 and extraordinary ray 46, of which vibration directions are perpendicular to an optical axis 44 and orthogonal to each other, are linearly polarized light. The thus separated ordinary ray 45 and extraordinary ray 46 are each given a slight separation angle when penetrating the Wollaston prism 42, and are therefore collimated with a slight spacing from each other by action of convergence of an objective lens 3. The collimated rays of light respectively fall upon slightly separated positions on a subject 4.

The two rays 45 and 46 respectively reflected on from the subject 4, converge on the Wollaston prism 42 by the action of convergence of the objective lens 3, and again travel on the same optical path by the action of birefringence of the Wollaston prism 42. Then, the rays 45 and 46 pass through the beam splitter 41, and an analyzer 43 fetches only equi-directional vibration components of the rays of linearly polarized light orthogonal to each other in the two rays 45 and 46, and these two rays interfere with each other, thereby forming an image 5. In the image 5, interference fringes corresponding to a phase difference given to the two rays 45 and 46 when reflected in positions slightly different from each other on the subject 4, are observed.

The image 5 is a so-called differential image, and a phase slope can be observed as a relief image (a protruded/recessed image) or an interference color image due to brightness and darkness of the image depending on an observation condition. Further, it is a classical method to quantify a phase distribution from an interference color of the interference color image. According to this method, the interference color observed is compared with a previously prepared interference color chart showing a relation between the interference color and the phase difference, thereby obtaining a phase difference Δ between the two rays 45 and 46 at a point of the observation. Herein, a slope angle θ of the subject 4 at the point of the observation is given by:

$$\tan \theta = \Delta/(2S)$$

where S is a shear amount (a separation breadth between the two rays 45 and 46 on the subject 4) of the differential interference microscope.

Further, a phase difference t with the whole slope can be calculated such as:

$$t = d \cdot \tan \theta$$

where d is a width of the slope portion containing the point of the observation of the subject 4.

Moreover, if a phase difference substantially equal to a central wavelength λ of the white light, is given between the two rays 45 and 46 reflected by the subject 4, the image 5 assumes a red purple color. This is called a sensitive color image. Such a red purple color image can be formed by sliding the Wollaston prism 42 in a direction of wedge angle, or by inserting one wavelength plate into the optical system. In the sensitive color image, the interference color changes sensitively to a slight change in phase, and hence a phase difference of the subject 4 can be estimated with a high accuracy.

In the conventional differential interference microscope described above, however, the protrusion and recess of the relief image reversely appear and the interference color appears differently, depending on a polarizing direction of the two rays 45 and 46 or on how an orientation of an analyzer 43, is set. It is therefore difficult to judge whether the phase slope is positive or negative. Further, there arises a problem in which the estimation of the phase difference on the basis of the interference color in the prior art has a large scatter in terms of a result due to a subjectivity of the observer, an error in print colors of an interference color chart, a spectral characteristic intrinsic to the optical system and so on. Another problem is that the estimation is time-consuming.

For obviating these problems, for example, Japanese Patent Application Laid-Open Nos.5-232384, 9-105864 and 10-104524 disclose methods of taking in a plurality of images with changes in the observation conditions while changing the phase difference of the image by moving a component constituting the apparatus, and calculating the phase slope and the phase difference with a high accuracy by executing an arithmetic process with use of the data about the plurality of images. According to those methods, however, it is required that the optical components of the apparatus be electrically movable, and besides the complicated arithmetic process be executed.

SUMMARY OF THE INVENTION

It is a primary object of the present invention, which was devised to obviate the problems described above, to provide an interference microscope, that is, though simple in its construction, capable of quantitatively detecting a phase distribution of a subject.

To accomplish the above object, according to one aspect of the present invention, an interference microscope comprises an illumination optical system for making two light beams fall on a subject to be inspected, an observation optical system for forming an interference image by causing interference between the two light beams from the subject, a detection unit for detecting the interference image, and a calculation unit for calculating a phase difference between the two light beams from a result of the detection by the detection unit. The two light beams contain light having a plurality of wavelengths. The detection unit detects light intensities with respect to the light having the plurality of wavelengths that is contained in the interference image. The calculation unit calculates such a wavelength as to minimize the light intensity from the light intensities of the light having the plurality of wavelengths which are detected by the detection unit, and sets, as the phase difference, a magnitude of the calculated wavelength.

DESCRIPTION OF THE PREFERRED EMBODIMENTS

Embodiments of the present invention will hereinafter be discussed.

To start with, a differential interference microscope in a first embodiment of the present invention will be described referring to FIG. 1.

Figure 1:
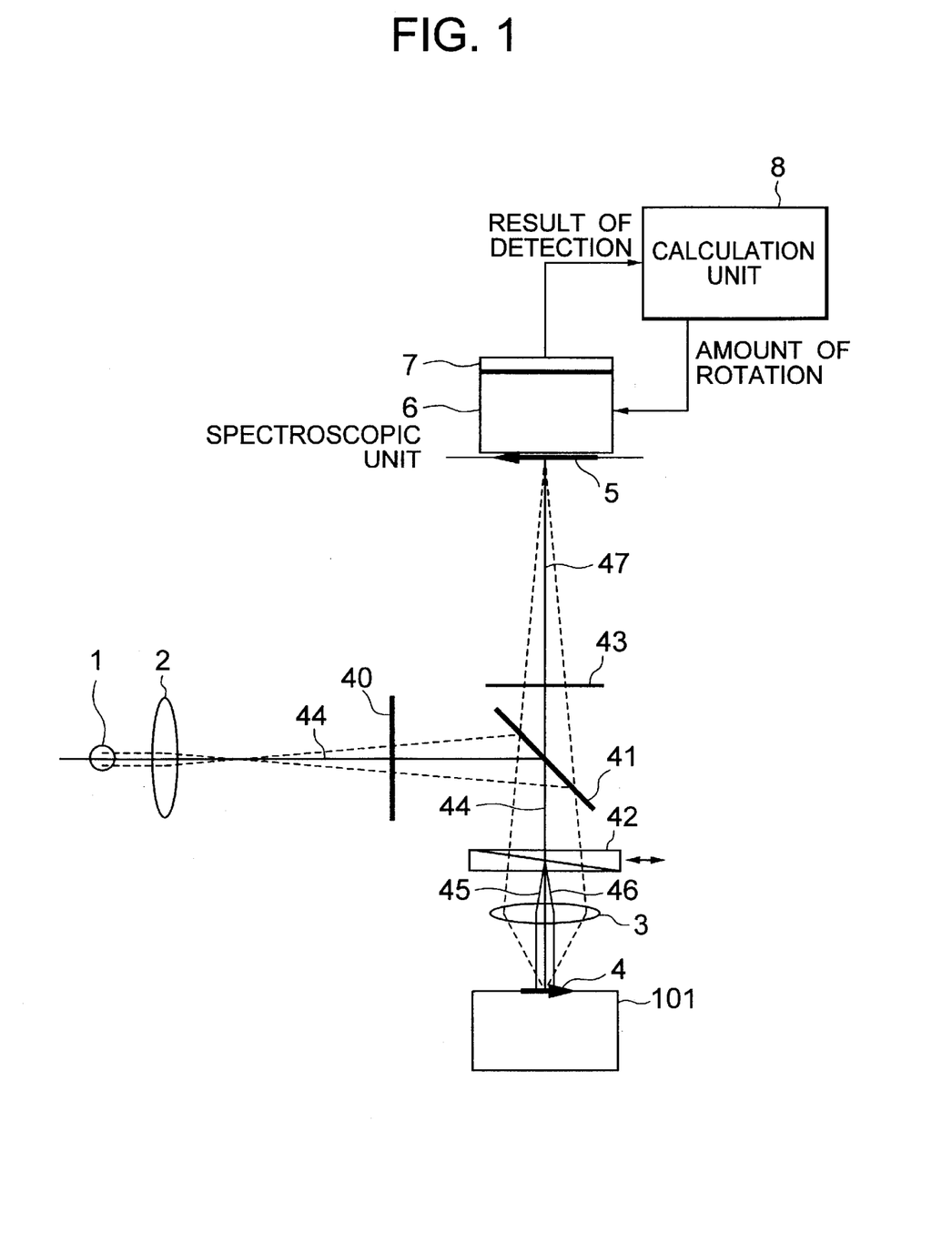
FIG. 1 is a block diagram showing a geometry of components of a reflected light differential interference microscope in a first embodiment of the present invention.

Referring to FIG. 1, the differential interference microscope includes a white light source 1 and a stage 101 mounted thereon with a subject 4 to be inspected. A collector lens 2, a polarizer 40, a beam splitter 41, a Wollaston prism 42 and an objective lens 3 are disposed in sequence along an optical axis 44 between the white light source 1 and the subject 4. Further, an analyzer 43 and a spectroscopic unit 6 are disposed along an optical axis 47 divided from the optical axis 44 by the beam splitter 41. A detection unit 7 for detecting spectrums into which the light has been decomposed, is connected to the spectroscopic unit 6. A calculation unit 8 is connected to the detection unit 7.

What is usable as the spectroscopic unit 6 may be a spectroscope having a general construction as written on pp.412~414 in, e.g., "Principles of Optics (written by Max Born, 6th Edition, Pergamon Press, 1980). This embodiment involves the use of the spectroscopic unit having an inlet slit, a dispersion element for dispersing wavelengths of the light entering the inlet slit, and an outlet slit that a beam of light having a desired wavelength among beams of light, of which the wavelengths are dispersed by the dispersion element, exits. The dispersion element may involve the use of a diffraction grating, a prism, etc. Further, the spectroscopic unit 6 has a drive unit for rotating the dispersion element, and a direction of the dispersion element is changed by this drive unit, whereby wavelengths of light emerging from the outlet slit can be scanned. Note that a rotational driving quantity of the drive unit of the dispersion element is controlled by the calculation unit 8. A slit width of the outlet slit is set corresponding to a necessary breadth of the wavelength.

Further, the Wollaston prism 42 is fitted with a driving source (unillustrated) for sliding this Wollaston prism 42 in a direction perpendicular to the optical axis 44 as well as in a direction of a wedge angle. Moreover, the stage 101 mounted thereon with the subject 4 is provided with a built-in driving source for moving the subject 4.

Next, an operation of each of components of the differential interference microscope in FIG. 1 will be explained.

White illumination light emitted from the white light source 1 is converged by the collector lens 2 and travels through the polarizer 40, thereby becoming a beam of linearly polarized light. The illumination light of this linearly polarized light beam is reflected by the beam splitter 41 and travels through the Wollaston prism 42. The white illumination light of the linearly polarized light beam is, when passing through the Wollaston prism 42, separated into ordinary ray 45 and extraordinary ray 46 by double refraction. Both of those ordinary ray 45 and extraordinary ray 46, are linearly polarized light. Their vibration directions are perpendicular to the optical axis 44 and orthogonal to each other. The thus separated ordinary ray 45 and extraordinary ray 46 are each given a slight separation angle when penetrating the Wollaston prism 42, and are therefore made parallel with a slight spacing from each other by action of convergence of the objective lens 3. These parallel light rays respectively fall upon positions slightly spaced apart from each other on the subject 4. Note that an interval (a separation breadth or a shear amount) between two rays 45 and 46 when falling upon the subject 4 be, it is desirable, smaller than a resolution limit of the objective lens 3 in the case of observing a hyperfine structure. Further, if a slope of the subject 4 is gentle, for enhancing a phase difference detection sensitivity, the interval (the separation breadth) between the two rays 45 and 46 may be set larger than the resolution limit of the objective lens 3.

The two rays 45 and 46 respectively reflected on from the subject 4, converge on the Wollaston prism 42 by the action of convergence of the objective lens 3, and again travel along the same optical path by the double refraction of the Wollaston prism 42. Then, the two rays 45 and 46 pass through the beam splitter 41, and the analyzer 43 fetches only equi-directional vibration components of the linearly polarized light orthogonal to each other in the two rays 45 and 46, and these two light components interfere with each other, thereby forming an image 5. The image 5 assumes an interference color corresponding to a phase difference between the two rays 45 and 46.

An operator observes the interference color of this image 5 and, adjusts a phase difference by shifting the Wollaston prism by operating the prism driving source of the Wollaston prism 42 so that the interference color of a background area of the subject 4 may become a sensitive color. At this time, the phase difference between the two rays 45 and 46 has been so adjusted to be substantially equal to a central wavelength $\lambda$ of the white illumination light, and the interference color changes sensitively to a slight change in phase of the subject.

The light of the image 5 of the background in which the sensitive color is thus set, is separated into spectrums by the spectroscopic unit 6, and the detection unit 7 detects a spectral intensity thereof. To be specific, the calculation unit 8 takes in the light intensity detected by the detection unit 7 while indicating an amount of rotation to the dispersion element. The light of the image 5 which enters the inlet slit of the spectroscopic unit 6, is dispersed by the dispersion element, and only the light having a wavelength corresponding to the amount of rotation of the dispersion element exits the outlet slit, and the detection unit 7 detects the light intensity having this wavelength. The light intensity of each of wavelengths contained in the image 5 can be thereby detected.

Figure 2:
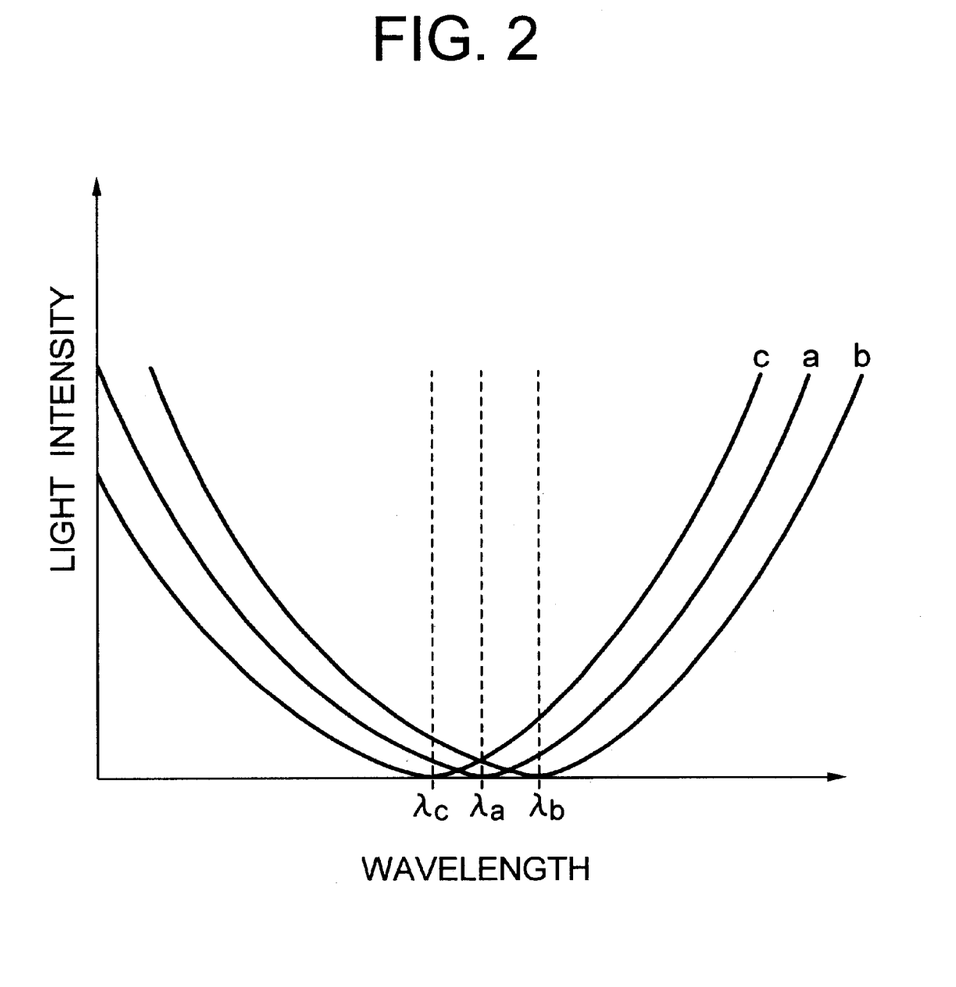
FIG. 2 is a graph showing a relation between a wavelength and an intensity of the light decomposed into spectrums by a spectroscopic unit 6 of the differential interference microscope in FIG. 1.

This spectral intensity plots a curve a in a graph in FIG. 2, wherein the axis of abscissa indicates the wavelength, and the axis of ordinates indicates the light intensity. The curve a has its minimum value (as close as zero) at a wavelength $\lambda a$. This wavelength $\lambda a$ indicates a phase difference between the two rays 45 and 46 in the analyzer 43. In case where the point of observation is embraced by the background assuming the sensitive color, the wavelength $\lambda a$ takes a value substantially equal to the central wavelength $\lambda$ of the white illumination light.

The calculation unit 8 obtains such a wavelength $\lambda a$ that the taken-in light intensity comes to the minimum value. As for the value of the wavelength, however, a wavelength value corresponding to the amount of rotation indicated to the dispersion element from the calculation unit 8, is obtained based on a relation between the amount of rotation of the dispersion element of the spectroscopic unit 6 and an outgoing wavelength which have been obtained beforehand, and this value is used.

Next, the operator operates so that the stage 101 is moved by the driving source incorporated into this stage, and the point of observation is thereby shifted to an area B of the subject 4 at which a phase slope should be obtained. With respect to the image 5 at the point of observation of the subject 4, the calculation unit 8 takes in the light intensity detected by the detection unit 7 while indicating the amount of rotation to the dispersion element of the spectroscopic unit 6 in the same way as the above-mentioned. A relation between the taken-in light intensity and the wavelength plots a curve b in FIG. 2. The calculation unit 8 obtains such a wavelength $\lambda b$ that the taken-in light intensity takes a minimum value.

Further, the operator moves the point of observation further to an area C of the subject 4 at which a phase slope should be obtained. With respect to the image 5 at that point of observation, the calculation unit 8 takes in the light intensity detected by the detection unit 7 while indicating the amount of rotation to the dispersion element of the spectroscopic unit 6. A relation between the taken-in light intensity and the wavelength plots a curve c in FIG. 2. The calculation unit 8 obtains such a wavelength $\lambda c$ that the taken-in light intensity takes a minimum value.

The wavelength $\lambda b$ indicates a phase difference between the two rays 45 and 46 when observing the area B of the subject 4, and the wavelength $\lambda c$ indicates a phase difference between the two rays 45 and 46 when observing the area C of the subject 4. Referring to FIG. 2, the wavelength $\lambda b$ is larger than the wavelength $\lambda a$, and hence it can be understood that the phase difference in the area B is larger than the phase difference in the area A of the background. Further, the wavelength $\lambda c$ is smaller than the wavelength $\lambda a$, and it can be therefore understood that the phase difference in the area C is smaller than the phase difference in the area A of the background and that, assuming that the background area A exhibits a phase difference of 0 (i.e., plane), the area A shows a negative phase slope (a negative inclination). At this time, a value of a phase difference $\Delta$ in the area B is expressed by $(\lambda b - \lambda a)$, and a phase difference $\Delta$ in the area C is given by $(\lambda c - \lambda a)$.

Hence, the calculation unit 8 calculates $(\lambda b - \lambda a)$ and $(\lambda c - \lambda a)$ from the obtained wavelengths $\lambda a$, $\lambda b$, $\lambda c$, and outputs calculated results. The operator is thereby able to obtain the phase differences with respect to the respective areas B and C of the subject 4. A slope angle $\theta$ of the subject 4 in each of the areas B, C can be given by $\tan \theta = \Delta/(2S)$, where $\Delta$ is the phase difference obtained, and S is the separation breadth between the two rays 45 and 46 on the subject 4.

Further, a phase difference distribution (a phase slope distribution) of the subject can be obtained by seeking the phase differences based on the above method with respect to the individual points at a predetermined interval on the subject 4 while scanning over the subject 4 on the moving stage 101. Further, the calculation unit 8 integrates the thus obtained phase slope distribution, whereby the phase distribution of the subject can be acquired.

As discussed above, according to the differential interference microscope in FIG. 1, with respect to the background of the subject 4 and each of points of observation on the subject 4, a wavelength that the intensity of the interference color of the image 5 is minimized is obtained and a difference in wavelength between the background and the point of observation is calculated, whereby the phase difference between the points of observations, can be obtained. This eliminates a possibility in which the phase difference might be mistaken in terms of being negative and positive, and makes it feasible to eliminate an influence of a subjectivity of the operator and an error in the print colors on a interference color chart, thereby it becoming possible to obtain the phase difference with a high accuracy.

Besides, once the sensitive color is set, the differential interference microscope in FIG. 1 is not required to make movable the optical parts constituting the microscope during the measurement, and therefore has an advantage of being simple in construction.

Figure 3:
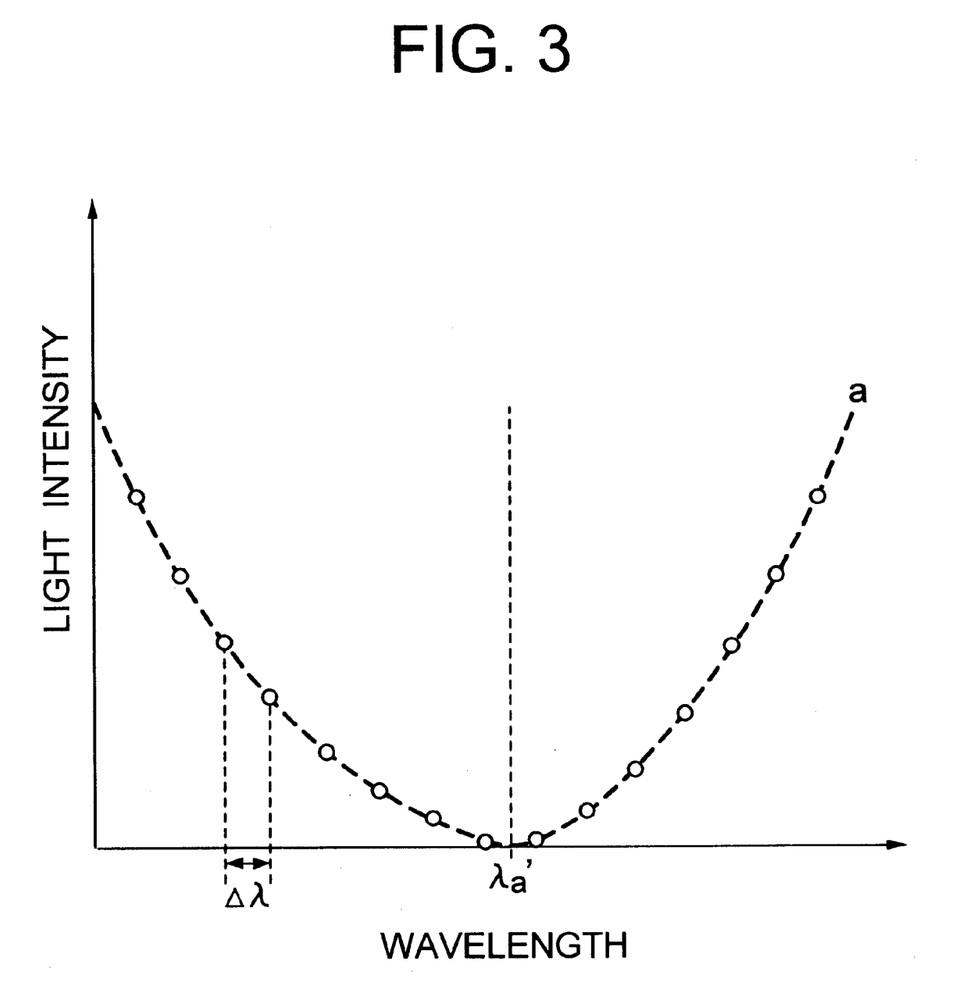
FIG. 3 is a graph showing a relation between the wavelength and the intensity of the light discretely decomposed into to spectrums by the spectroscopic unit 6 of the differential interference microscope in FIG. 1.

Furthermore, in the above discussion, there was given the example in which the spectroscopic unit 6 substantially consecutively separates the light into spectrums, and the continuous curve showing the relation between the wavelength and the light intensity as shown in FIG. 2 is detected. The continuous curve as shown in FIG. 2 may not necessarily be obtained, and one possible option is that spectral intensities with respect to a plurality of wavelengths predetermined as indicated by white circles in FIG. 3 may be measured. In this case, based on the obtained result of discrete detections, the calculation unit 8 arithmetically estimates such a wavelength that the light intensity is minimized. For example, an interpolation calculation, curve fitting, etc. are performed based on the discrete data indicated by the white circles in FIG. 3, and a curve a' shown by the broken line in FIG. 3 is thereby estimated. Then, a wavelength $\lambda a'$, with which to take a minimum value of the light intensity, may also be obtained. Moreover, it is also possible to use a method of obtaining $\lambda a'$ by performing a weight calculation of applying data in the vicinity of $\lambda a'$ to a table showing a relation between a previously measured value of $\theta a'$ and data in the vicinity thereof.

In the case of using $\theta a'$ obtained based on the discrete data given above, the data of the spectral intensities with respect to at least three different wavelengths, may suffice. Configurations spectral intensity curves a, b, c may also be obtained beforehand by calculations. Further, when using the discrete data, the light source 1 may not be the white light source, and is sufficient if capable of emitting the light having the wavelengths to be separable into spectrums by the spectroscopic unit 6.

In the case of using the method of obtaining the wavelength with which to take the minimum value from the discrete data as by those methods, what is usable as the spectroscopic unit 6 may be discrete in its spectroscopic capability, and hence the configuration of the spectroscopic unit 6 can be simplified. This yields an advantage that the costs can be reduced.

Figure 4:
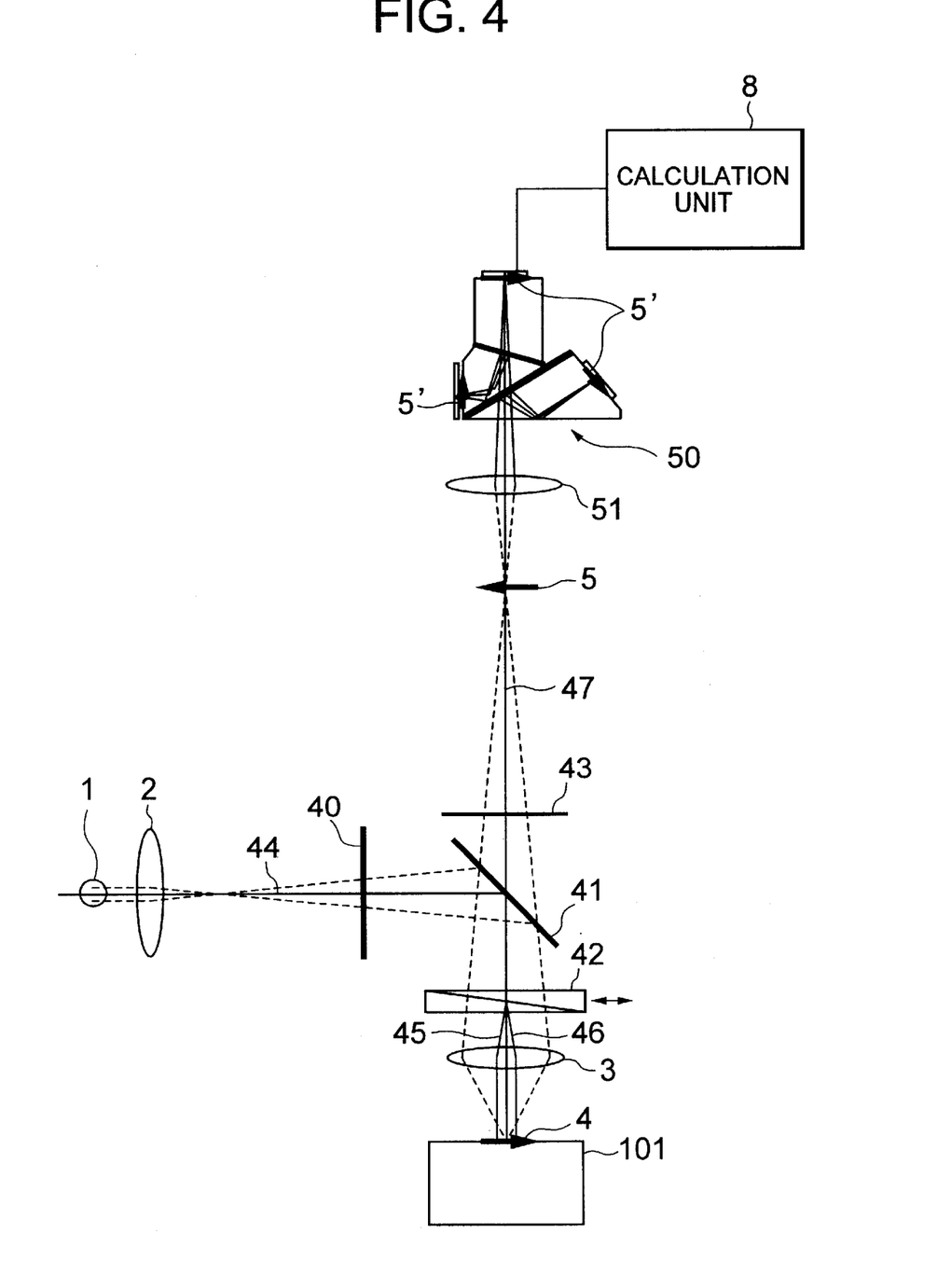
FIG. 4 is a block diagram showing a geometry of components of the differential interference microscope in a second embodiment of the present invention.

Next, a second embodiment of the differential interference microscope will be explained referring to FIG. 4.

Figure 5:
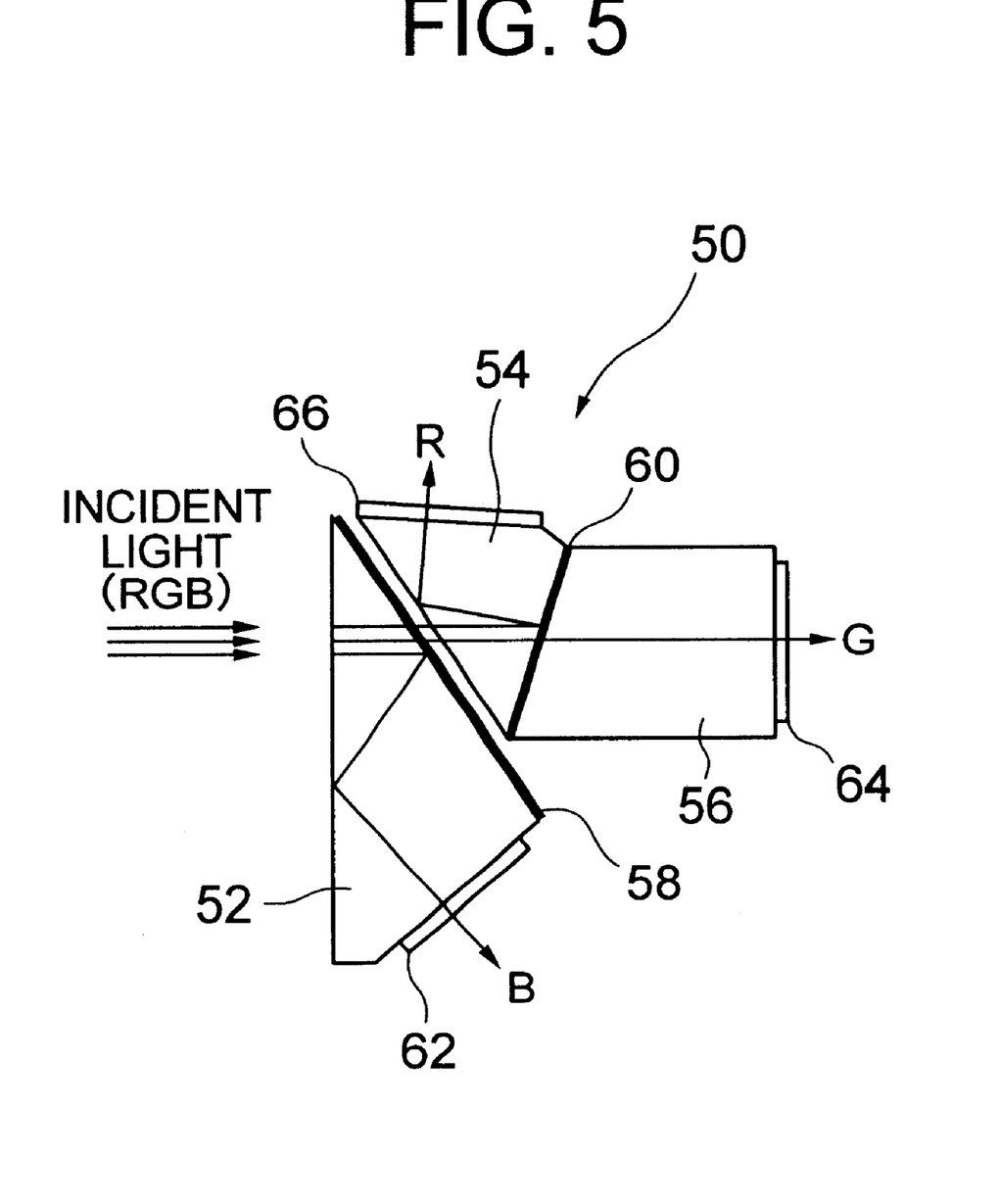
FIG. 5 is an enlarged explanatory diagram showing a 3CCD camera used in the second embodiment of the present invention.

The differential interference microscope in the second embodiment uses a color 3 CCD camera 50 and a relay lens 51 instead of the spectroscopic unit 6 and the detection unit 7 used in the first embodiment. The color 3CCD camera itself is known and has, as shown in FIG. 5, three pieces of CCDs 52, 54, 56 for blue (B), green (G) and red (R), a blue-reflection dichroic mirror 58 and a red-reflection dichroic mirror 60. The dichroic mirror separates the light of the image 5 which is incident via the relay lens 51 into three fluxes of light B, light G and light R, and makes these fluxes of light incident upon CCDs 62, 64, 66 for the B-, G- and R-colors, thereby each forming an image 5'.

The calculation unit 8 takes in outputs of pixels corresponding to the three CCDs for B-, G- and R-colors, and is thereby capable of obtaining the light intensities with respect to three B-, G- and R-wavelengths of those pixels of the images 5. Then, the calculation unit 8, based on the light intensities with respect to these three wavelengths, obtains such a wavelength that the light intensity is minimized by executing the above weight calculation, etc. Note that other configurations are the same as those in the first embodiment and marked with the like numerals, of which the repetitive explanations are herein omitted.

In this construction, the color 3CCD camera is capable of taking in the image of the background and the image 5 of the whole subject 4 at one time. Therefore, the wavelength λa of the sensitive color of the background is obtained from the light intensities with respect to the three R-, G- and R-wavelengths of the pixels of the background, and the wavelength λb of the desired area can be obtained from the pixels of this area of the subject 4. Hence, the phase slope distribution of the entire subject 4 can be obtained simply by imaging once the image 5 without moving the subject 4.

As discussed above, in the differential interference microscope in the second embodiment, the light intensity per wavelength can at one time be obtained without driving the wavelength dispersion element to effect wavelength scanning, like the spectroscopic unit 6 in the first embodiment, by use of the color 3CCD camera. Therefore, the differential interference microscope is, though simple in construction enough not to require the movable unit, capable of quantitatively obtaining the phase difference. Besides, the image in a wide range can be imaged at one time, and the phase difference is obtained per pixel, whereby the phase slope distribution of the entire subject 4 can be obtained at one time.

Note that the CCDs are used in the second embodiment, however, three detecting elements having a sensitivity in different wavelengths can be also used. In this case, unlike the CCDs, the phase slope distribution of the entire subject 4 can not be obtained at one time, however, the construction of the apparatus becomes simple because of no necessity for decomposing the light into spectrums according to the wavelengths.

Moreover, the differential interference microscope in the first and second embodiments may also be constructed so that a bright field image other than the differential interference image 5 is separately taken in, and the spectral output of the differential interference image 5 is corrected by use of a spectral output of this bright field image. When thus corrected by use of the spectral output of the bright field image, it is feasible to eliminate the ununiformity of the background and the spectral output occurred in the interference image 5 due to the optical absorption distribution and the spectral characteristic of the subject 4 itself. Therefore, the phase difference can be detected with a higher accuracy. It is to be noted that as for a possible construction for taking in the bright field image, for instance, the image 5 is taken in in a state of causing no interference by removing the analyzer 43 from the optical path, or an optical path for the bright field which serves to make the light from the collector lens 2 incident directly upon the objective lens 3, is formed, and the bright field image formed through this optical path is taken in. A usable method of correction based on the bright field image may involve subtracting the spectral output of the bright field image from the spectral output of the differential interference image or dividing it. Further, when performing the subtraction or division, that may be multiplied by a proper coefficient.

Note that the differential interference microscope in the first and second embodiments is constructed as the reflection illumination type differential interference microscope but may also be constructed as a transmission illumination type differential interference microscope.

Moreover, the differential interference microscope in the embodiments discussed above is constructed so that the operator executes the operation of setting the sensitive color in the background by shifting the prism of the Wollaston prism 42, but may also be constructed so that the calculation unit 8 detects the wavelength λa with respect to the background and controls the drive of the prism of the Wollaston prism 42 so that λa takes a value in the vicinity of the central wavelength (in the vicinity of 520 nm) of the white light source, thereby automatically setting the sensitive color.

Moreover, in the differential interference microscope described above, the phase difference between the two rays 45 and 46 by shifting the prism of the Wollaston prism 42 and thus sets the sensitive color. A mechanism for adjusting the phase difference between the two rays 45 and 46 for setting the sensitive color is not, however limited to this mechanism. There may also be used other known methods for setting the sensitive color of the differential interference microscope such as a method of inserting a wave plate into the optical path, and so on.

In the differential interference microscope described above, the Wollaston prism 42 is used for separating the two rays 45 and 46, however, other optical elements such as a Nomarski prism, etc. may also be used.

As discussed above, according to the present invention, there can be provided the interference microscope which is, though simply constructed, capable of quantitatively detecting the phase distribution of the subject.

What is claimed is:

1. An interference microscope comprising:

an illumination optical system for making two light beams fall on a subject to be inspected;

an observation optical system for forming an interference image by causing interference between the two light beams from the subject;

a detection unit for detecting the interference image; and a calculation unit for calculating a phase difference between the two light beams from a result of the detection by said detection unit, wherein the two light beams contain light having a plurality of wavelengths, said detection unit detects light intensities with respect to the light having the plurality of wavelengths that is contained in the interference image, and said calculation unit obtains such a wavelength as to minimize the light intensity from the light intensities of the light having the plurality of wavelengths which are detected by said detection unit, and sets, as the phase difference, a magnitude of the obtained wavelength.

2. An interference microscope according to claim 1, wherein said calculation unit obtains a phase slope with respect to the subject by obtaining a difference between the wavelengths for minimizing the light intensity which are obtained with respect to a plurality of points on the subject.

3. An interference microscope according to claim 2, wherein said observation optical system includes an optical system for forming a bright field image of the subject, said calculation unit corrects a result of detecting the interference image on the basis of a result of detecting the bright field image detected by said detection unit, and calculates the phase difference by use of a result of this compensation.

4. An interference microscope according to claim 1, wherein said calculation unit obtains a phase slope of the subject by obtaining a difference between the wavelength for minimizing the light intensity which is obtained with respect to the subject and a such a wavelength as to minimize the light intensity with respect to a predetermined fiducial object.

5. An interference microscope according to claim 4, wherein said observation optical system includes an optical system for forming a bright field image of the subject, said calculation unit corrects a result of detecting the interference image on the basis of a result of detecting the bright field image detected by said detection unit, and calculates the phase difference by use of a result of this compensation.

6. An interference microscope according to claim 1, wherein said observation optical system includes an optical system for forming a bright field image of the subject, said calculation unit corrects a result of detecting the interference image on the basis of a result of detecting the bright field image detected by said detection unit, and calculates the phase difference by use of a result of this compensation.

7. An interference microscope comprising:

an illumination optical system for making two light beams fall on a subject;

an observation optical system for forming an interference image by causing interference between the two light beams from the subject;

an imaging unit for imaging the interference image; and a calculation unit for calculating a phase difference between the two light beams from a result of the detection by said imaging unit, wherein said imaging unit includes three pieces of imaging elements respectively having light receiving sensitivities for three wavelengths, and said three imaging elements receive beams of image light having the three wavelengths of the interference image, said calculation unit obtains light intensities of the three wavelengths with respect to the pixels of the interference image from the light receiving intensities of the pixels corresponding to said three imaging elements, then, based on these light intensities, obtains such a wavelength as to minimize the light intensity, and sets, as the phase difference, a magnitude of the obtained wavelength.

* * * * *